(12) United States Patent
Baumann et al.

(10) Patent No.: US 10,731,707 B2
(45) Date of Patent: Aug. 4, 2020

(54) SEALED BEARING MODULE

(71) Applicant: Aktiebolaget SKF, Gothenburg (SE)

(72) Inventors: Michael Baumann, Gädheim (DE); Matthias Hofmann, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/267,777

(22) Filed: Feb. 5, 2019

(65) Prior Publication Data

US 2019/0242435 A1    Aug. 8, 2019

(30) Foreign Application Priority Data

Feb. 7, 2018   (DE) .................. 10 2018 201 885

(51) Int. Cl.
| | | |
|---|---|---|
| *F16C 33/78* | (2006.01) | |
| *F16C 41/00* | (2006.01) | |
| *F16C 19/54* | (2006.01) | |
| *F16C 33/60* | (2006.01) | |
| *F16C 19/50* | (2006.01) | |
| *F16C 33/58* | (2006.01) | |

(52) U.S. Cl.
CPC ........ *F16C 33/7823* (2013.01); *F16C 19/505* (2013.01); *F16C 19/545* (2013.01); *F16C 33/586* (2013.01); *F16C 33/60* (2013.01); *F16C 33/783* (2013.01); *F16C 41/004* (2013.01); *F16C 2226/60* (2013.01); *F16C 2300/14* (2013.01); *F16C 2360/00* (2013.01); *F16C 2380/26* (2013.01)

(58) Field of Classification Search
CPC .... F16C 33/78; F16C 33/784; F16C 33/7823; F16C 33/7896; F16C 33/7813; F16C 2360/00; F16C 2380/26; F16C 2300/14; F16C 2226/60; F16C 29/086; F16C 41/004; F16C 33/60; F16C 33/783; F16C 33/586
See application file for complete search history.

(56) References Cited

U.S. PATENT DOCUMENTS 1,812,385 A * 6/1931 Troyer .................... F16C 33/78
                                                          277/353
2,887,331 A * 5/1959 Johnson .................. F16C 33/78
                                                          277/562
(Continued)

FOREIGN PATENT DOCUMENTS

| DE | 102011016185 A1 | 10/2012 |
| DE | 202012011902 U1 | 1/2013 |

(Continued)

OTHER PUBLICATIONS

Machine Translation of JP-63312512-A (Year: 1988).*

*Primary Examiner* — Alan B Waits
(74) *Attorney, Agent, or Firm* — J-TEK Law PLLC; Scott T. Wakeman; Mark A. Ussai

(57) ABSTRACT

A sealed bearing module for a tidal turbine, the tidal turbine including a hub and at least one rotor blade, the sealed bearing module including an inner ring, and an outer ring, and a seal system configured to seal the bearing module. The outer ring includes axially extending bores configured to receive fasteners for attaching the outer ring directly to the hub, and the inner ring includes axially extending bores for attaching the inner ring directly or indirectly to the rotor blade.

20 Claims, 1 Drawing Sheet

(56) References Cited

U.S. PATENT DOCUMENTS

| | | | | |
|---|---|---|---|---|
| 4,174,672 | A * | 11/1979 | Cox | B63H 23/321 |
| | | | | 114/57 |
| 4,527,915 | A * | 7/1985 | Ikariishi | B21B 31/07 |
| | | | | 384/480 |
| 5,927,864 | A * | 7/1999 | Feerick | F16C 23/084 |
| | | | | 384/482 |
| 8,696,204 | B2 * | 4/2014 | Ooga | F16C 33/76 |
| | | | | 277/345 |
| 8,985,856 | B2 * | 3/2015 | Arai | F16C 29/0633 |
| | | | | 277/560 |
| 9,051,966 | B2 * | 6/2015 | Matsumoto | F16C 29/086 |
| 9,334,901 | B2 * | 5/2016 | Schroppel | F03B 11/006 |
| 2011/0278851 | A1 * | 11/2011 | Fujioka | F16J 15/002 |
| | | | | 290/55 |
| 2013/0039611 | A1 * | 2/2013 | Russ | F16C 19/381 |
| | | | | 384/486 |
| 2013/0322803 | A1 * | 12/2013 | Gruber | F16C 33/7806 |
| | | | | 384/477 |
| 2014/0191508 | A1 * | 7/2014 | Schroppel | F03B 11/006 |
| | | | | 290/53 |
| 2014/0219589 | A1 * | 8/2014 | Hooper | B63B 21/507 |
| | | | | 384/99 |
| 2016/0091025 | A1 * | 3/2016 | Bredoire | F16C 19/26 |
| | | | | 384/508 |
| 2017/0082145 | A1 * | 3/2017 | Harada | F16C 33/7813 |

FOREIGN PATENT DOCUMENTS

| | | | | |
|---|---|---|---|---|
| DE | 102014205637 | A1 | 10/2015 | |
| EP | 2743522 | A1 | 6/2014 | |
| EP | 3001058 | A1 | 3/2016 | |
| JP | 63312512 | A * | 12/1988 | F16C 19/381 |

* cited by examiner

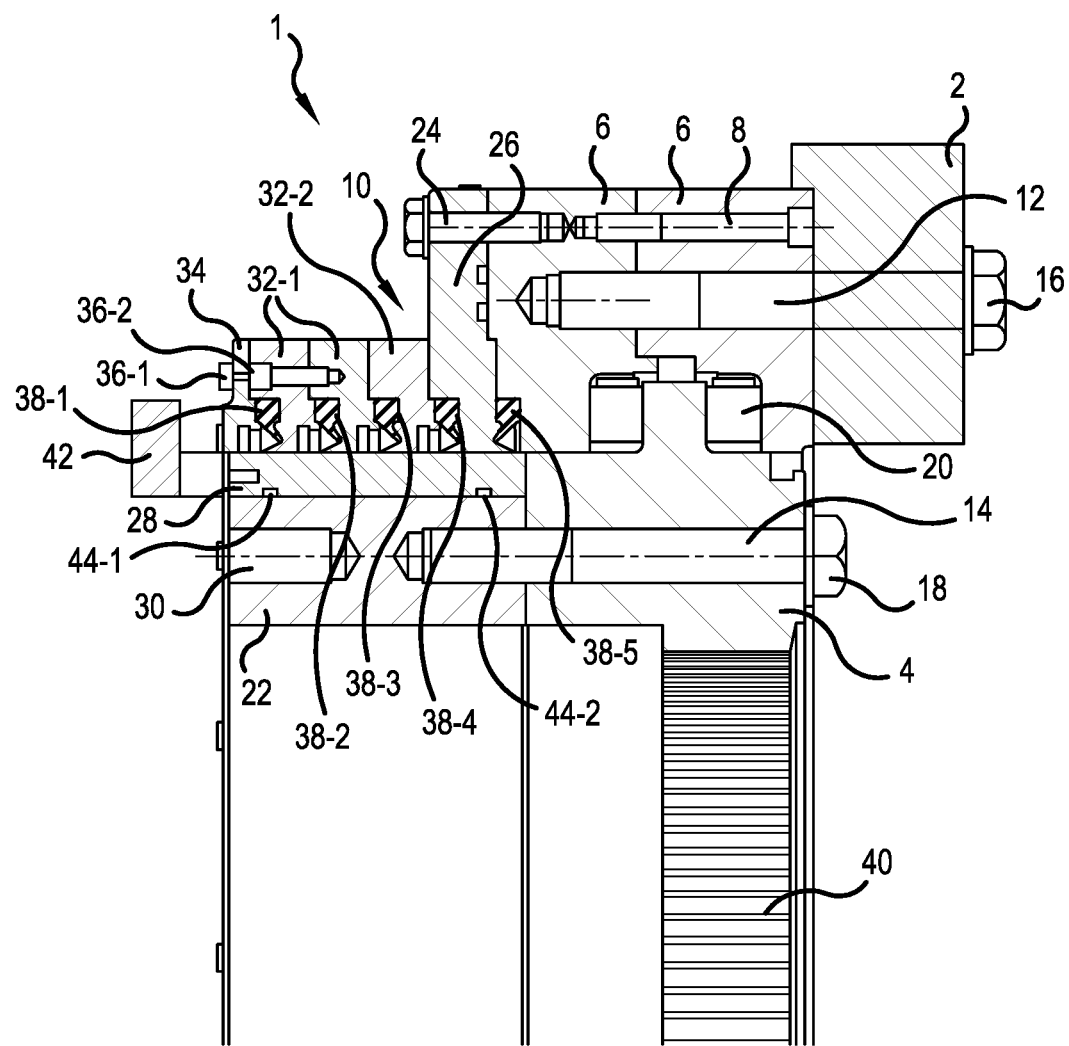

US 10,731,707 B2

SEALED BEARING MODULE

CROSS-REFERENCE

This application claims priority to German patent application no. 10 2018 201 885.5 filed Feb. 7, 2018, the contents of which are fully incorporated herein by reference.

TECHNOLOGICAL FIELD

The present invention relates to a sealed bearing module for a tidal turbine.

BACKGROUND

To date, bearing assemblies are supplied as individual parts and installed and assembled on-site in a tidal turbine. In such case the individual elements are usually only sealed on-site. Since tidal turbines are used under water, the seal-tightness of the bearing is particularly important because moisture can very easily enter and damage the bearing in the long term. After the installation of the bearing assembly into the tidal turbine, the seal-tightness of the bearing must therefore be tested. This involves a great expense since the testing is performed on the tidal turbine and not during the manufacturing of the bearing.

SUMMARY

It is therefore an aspect of the disclosure to provide a bearing assembly wherein the testing for seal-tightness can be simplified.

The sealed bearing module can be disposed between a hub and a rotor blade of a tidal turbine. For this purpose the bearing module includes an inner ring and an outer ring. Furthermore the bearing module includes a seal system for sealing the bearing module.

To date bearing assemblies have been supplied as individual parts and installed on-site in tidal turbines. In particular, the bearing rings are individually attached to the hub and to the rotor blade. The entire bearing is then sealed from the outside and tested for seal-tightness after installation.

In order to avoid this on-site testing, the disclosed bearing module is provided as a complete system and can be installed in the tidal turbine in an already assembled state, including a seal system. For this purpose the bearing includes, in the outer ring, axially extending bores for attaching the outer ring directly to the hub. Here the attaching is preferably effected from the hub side. The inner ring also includes axially extending bores for attaching the inner ring The bores of the inner ring and the bores of the outer ring can be distributed circumferentially around the inner ring and the outer ring. The bores are preferably distributed uniformly.

The bearing module can be inserted inter alia by attaching it as a whole into the tidal turbine from the hub side and can be installed therein. In this way a plug-and-play solution is provided that can be easily integrated into the tidal turbine. This reduces possible errors in installation. Furthermore, the necessary tests, such as, for example, for seal-tightness, can be performed ahead of time during the manufacturing process.

The seal system serves on the one hand to seal the bearing against sea water and on the other to hold lubricant in the bearing. The seal system is therefore disposed between the outer ring/inner ring and the rotor blade since seawater can penetrate from the side of the rotor blade.

The bearing can be a roller bearing. Single row or double row four-point contact ball bearings, crossed roller bearings, tapered roller bearings, or triple ring bearings can be used as rolling-element bearings. The rollers or balls of the bearing can be separated from each other by a window-type cage. According to one embodiment the outer ring is therefore a split outer ring.

The inner ring can be directly attached to the rotor blade. Alternatively the inner ring can be attached to the rotor blade via a spacer ring. If the inner ring is directly attached to the rotor blade, the inner ring will be larger in its axial extension than the outer ring in order to allow for the connection to the rotor blade. This can be avoided by using a spacer ring that allows for an axial extension of the inner ring toward the rotor blade. The spacer ring and the inner ring can be connected to each other, for example, via a screw connection.

In order to enable a simple exchange of the seal system, the seal system is detachably disposed directly on the outer ring and inner ring. In this way the seal system can be removed and exchanged even after the installation of the bearing module in the tidal turbine. Here the seal system is preferably disposed on a side of the outer ring opposite the hub.

The seal system can include a slip surface that radially surrounds the inner ring or the spacer ring. The slip surface can be manufactured from stainless steel, in particular chromium steel. In order to seal the inner ring, a seal can be provided between the slip surface and the inner ring or the spacer ring. This seal can be realized, for example, by O-rings that are disposed between the slip surface and the inner ring or spacer ring.

The seal system preferably includes a plurality of seal units. Here each seal unit is comprised of a seal carrier ring and a seal lip. Here the seal lips abut against the slip surface and are each disposed in a seal carrier ring. The individual seal carrier rings are disposed adjacent to each other in the axial direction with respect to the slip surface. Here two seal carrier rings can always be attached to each other using attachment means, for example, using a screw connection. Here the attachment means can be offset circumferentially in axial orientation with respect to one another.

The seal lips can be manufactured from a rubber or polyurethane material. The material used preferably includes an intrinsic lubrication and is suitable for use in seawater. With seal lips made of a polyurethane material (plastic) the intrinsic lubrication is effected by solid lubricants (carbon) that are embedded in the plastic in the manufacturing process.

The seal carrier rings can be comprised of stainless steel or cast iron, for example, grey cast iron. In addition the surface of the seal carrier rings can be protected by a corrosion protection layer. The corrosion protection layer can include, for example, zinc and can be applied as a lacquer or as a galvanized layer. When using cast iron, a sacrificial anode can be used in order to avoid or at least to delay corrosion of the cast iron.

The seal system can include a seal unit toward the outer ring, which seal unit is disposed directly on the outer ring. In comparison to the other seal units, this seal unit can be larger in the radial direction and correspond in its dimensions to the outer ring.

According to one embodiment, the seal system includes a seal unit that acts as a seal cover for the axially opposite side of the seal system. The seal cover closes the seal system with respect to the rotor blade. The other seal units are disposed on the outer ring between the seal cover and the seal unit.

The deviation in the runout between the rolling-element bearing and the seal system is reduced to the greatest possible extent. The runout is optimized by the axes of rotation of the seal lips and the seal slip surfaces coinciding to the greatest possible extent. A constant radial deformation of all seal lips during the pivoting- or rotational-movement is thereby avoided, and the wear of the seal lips is reduced.

The seal cover can also be comprised of stainless steel or cast iron. In addition the surface of the seal cover can be protected by a corrosion-protection layer, for example, a zinc layer.

Due to this arrangement in which the seal units are disposed axially adjacent to each other, the seal units can be exchanged in a simple manner. For this purpose only the seal cover need be removed and subsequently the first seal unit can be exchanged. If more than one seal unit is to be exchanged, the first seal unit and further seal units following the first seal unit can be exchanged.

If the seal carrier rings or the seal lips have different widths, then with an exchange of a plurality of seal units they can be reinstalled in a different order so that after the reinstallation the seal carrier rings or seal lips are located on different paths than before. In this way the wear of the slip surface can be uniformly distributed. Wear of the slip surface can occur due to the pressure of the seal lips against the slip surface.

According to one preferred embodiment five seal units are provided. The first four seal units serve for sealing the bearing against entering seawater. First here the first outermost seal unit, i.e., the seal cover, seals. When the first seal unit or its seal lips is worn out, that is, when it can no longer keep out seawater, the second to fourth seal lips serve as the subsequent seal against entering seawater. In this way a seal system is used that includes still further backup seal lips in addition to a primary seal lip. The innermost fifth seal lip, i.e., the seal lip that is disposed closest to the outer ring, serves to hold a lubricant in the bearing.

Furthermore, a seal can be disposed directly or indirectly between the inner ring and the one outer ring on the side of the bearing opposite the bearing in order to also hold the lubricant on this side in the bearing so that the bearing is sealed on both sides with respect to the lubricant.

The inner ring can be directly connected to gear teeth into which a gear of a rotary drive can engage. In this way not only is a simple-to-install, already sealed bearing module provided, but this can also be readily coupled to the rotary drive.

According to a further aspect, a tidal turbine including a hub and at least one rotor blade is disclosed, between which a bearing module sealed as described above is disposed.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWING

FIG. 1 is a sectional view of a sealed bearing module for a tidal turbine according to an embodiment of the present disclosure.

DETAILED DESCRIPTION

In the following, identical or functionally equivalent elements are designated by the same reference numbers.

FIG. 1 shows a sealed bearing module 1. The bearing module 1 is disposed between a hub 2 and a rotor blade (not shown) of a tidal turbine in order to rotatably support the rotor blade with respect to the hub 2. The bearing module 1 can be disposed in a housing (not shown). If the rotor blade is moved by the seawater, in particular due to the tides, a generator can be driven via the hub 2 in order to generate current. The rotor blade can be adjusted in its angle of attack (pitch adjustment) via gear teeth 40.

The bearing module 1 includes an inner ring 4 and an outer ring 6. In the embodiment shown it is a triple row roller bearing, for which reason the outer ring 6 is split in two. The two parts of the outer ring 6 are connected to each other by an attachment means 8 such as screws or bolts. Rolling elements 20 are disposed between the inner ring 4 and the outer ring 6.

The bearing module 1 includes bores 12 in the outer ring 6 and bores 14 in the inner ring 4 in order to directly connect the bearing module 1 to the hub 2 or the rotor blade. Here the outer ring 6 is directly attached to the hub by an attachment means 16, for example, a screw or bolt.

In the embodiment shown the inner ring 4 is not directly attached to the rotor blade, but rather is attached via a spacer ring 22. Here the spacer ring 22 is connected to the inner ring 4 via an attachment means 18 which may comprise a screw or a bolt. From the rotor blade side the spacer ring 22 is then connected to the rotor blade by an attachment means 30, for example, another screw or bolt. Here the inner ring assembly is thus configured two-part and is comprised of the spacer ring 22, which includes bores facing toward the rotor blade side and toward the inner ring, and the inner ring 4, which includes through-bores for attaching the spacer ring. Alternatively the inner ring 4 can be longer in the axial direction and can be directly connected to the rotor blade. Here the attaching of the inner ring 4 to the rotor blade is also effected from the rotor blade side.

Since the attaching by the bores 12 in the outer ring 6 can be effected from the hub side and not from the side of the outer ring 6, the bearing module 1 can already be completely assembled before installation. In particular a seal system 10 can already be installed.

In addition, the inner ring 4 is directly provided with gear teeth 40. A simple connection to the gear teeth of a drive can be effected by these gear teeth 40. Due to the connection between rotor blade, inner ring 4 (via the spacer ring 22 and the gear teeth 40) the position of the rotor blade with respect to the hub can be adjusted in order to be able to react to flow speeds, flow strength, or flow direction and to be able to set an optimum angle of attack.

In order to seal the bearing module 1, the bearing module 1 includes the seal system 10. The seal system 10 includes a plurality of seal units. Each of the seal units includes a seal carrier ring 26, 34, 32 and a seal element disposed therein including a seal lip 38. One of the seal units is directly connected to the outer ring 6 by its seal carrier ring 26. For this purpose an attachment means 24, for example, a screw, is screwed-in by the seal carrier ring 26 into the outer ring 6 from the side of the seal unit. This seal unit thus serves for attaching the seal system 10 to the outer ring. For this purpose the corresponding seal carrier 26 is adapted in its axial dimensions to the axial dimensions of the outer ring 6. In this way, the entire seal system 10 can be easily removed as needed from the outer ring 6 and exchanged.

A further seal unit serves for sealing outward. The seal carrier ring 34 of this seal unit represents a type of seal cover. A plurality of seal units including their seal carrier rings 32 are disposed between this and the seal unit 26. Each of these seal carrier rings 32 includes a seal element including a seal lip 38. The seal carrier rings 32 are connected to each other via attachment means 36, such as screws or bolts. Here two seal carrier rings 26, 32, 38 are always connected to each other. Here the attachment means 36 are circumferentially offset from one another in the axial direction.

In operation the seal lips 38 slip against a slip surface 28. Here a sealing of the slip surface 28 with respect to the spacer ring 22 is effected via O-rings 44.

If one of the seal lips 38 is worn out, it can be exchanged in a simple manner. For this purpose the seal cover 34 is first removed. Then the subsequent seal unit including its seal carrier ring 32 and the seal lip 38 can be removed and exchanged as a unit.

The first four seal lips 38-1 to 38-4 serve as a series connection for keeping seawater out of the bearing. Here the first seal lip 38-1 must withstand the highest pressure and is therefore worn out first. If the first seal lip 38-1 no longer withstands the pressure of the seawater, the second seal lip 38-2 following the first assumes this function. Here the first seal lip 38-1 also acts as a filter for larger impurities. A third and a fourth seal lip 38-3, 38-4 are provided as further spare seal lips. In the seal system 10 a sensor (not shown), for example a moisture sensor or pressure sensor, can be disposed that can issue a signal when seawater reaches the third or fourth seal lip 38-3, 38-4. As soon as such a signal is issued, an exchange of the seal lips 38 can be initiated. The fifth seal lip 38-5, which is disposed closest to the outer ring 6, serves to hold lubricant in the bearing.

For further protection of the sealed bearing module 1 a sacrificial anode 42 can be disposed on the slip surface 28. The sacrificial anode 42, which is an electrode made of a piece of base metal, serves to protect the bearing module 1 against contact corrosion. Here the material of the sacrificial anode 42 itself is destroyed by oxidation, while corrosion of the components of the bearing module 1 is delayed or completely avoided.

In summary a compact bearing assembly is provided by the disclosed sealed bearing module. This can already undergo required tests, such as, for example, for seal-tightness, prior to installation at its destination. Expensive tests after installation are therefore no longer required.

REFERENCE NUMBER LIST

1 Bearing module
2 Hub
4 Inner ring
6 Outer ring
8 Attachment means
10 Seal system
12 Bore
14 Bore
16 Attachment means
18 Attachment means
20 Rolling element
22 Spacer ring
24 Attachment means
26 Seal carrier ring
28 Slip surface
30 Attachment means
32 Seal carrier rings
34 Seal cover
36 Attachment means
38 Seal lips
40 Gear teeth
42 Sacrificial anode
44 O-rings

What is claimed is:

1. A sealed bearing module for a tidal turbine, the tidal turbine including a hub and at least one rotor blade, the sealed bearing module comprising:
    a hub side configured to face and be connected to the hub;
    a rotor blade side axially opposite the hub side;
    an outer ring;
    an inner ring;
    a spacer ring axially adjacent the inner ring; and
    a seal system configured to seal the bearing module, wherein
    the outer ring includes blind axial bores extending into the outer ring from the hub side, the axial bores being configured to receive an attachment means for attaching the outer ring directly to the hub, and
    the inner ring includes axial through bores for attaching the inner ring to the spacer ring,
    the spacer ring includes blind axial bores having openings facing the hub side, the blind axial bores of the spacer ring being aligned with the axial through bores of the inner ring and configured to receive a threaded fastener for securing the spacer ring to the inner ring, and
    the spacer ring includes blind axial bores on the rotor blade side for attaching the spacer ring to the rotor blade.

2. The sealed bearing module according to claim 1, wherein the outer ring is a split outer ring.

3. The sealed bearing module according to claim 1, wherein the seal system is detachably disposed directly on the outer ring and inner ring.

4. The sealed bearing module according to claim 1, wherein the seal system includes a slip surface that radially surrounds the inner ring or the spacer ring.

5. The sealed bearing module according to claim 4,
    wherein the seal system includes a plurality of seal units, and wherein each seal unit includes a seal element disposed in a respective seal carrier ring, each seal element having a seal lip in contact with the slip surface.

6. The sealed bearing module according to claim 5,
    wherein one of the seal units is disposed directly on the outer ring,
    wherein the seal system includes a seal cover, and
    wherein the remaining seal units are disposed between the seal unit on the outer ring and the seal cover.

7. The sealed bearing module according to claim 6, wherein the seal units are exchangeable from the side of the seal cover.

8. The sealed bearing module according to claim 4,
    wherein the seal system comprises a first seal unit including a first seal element disposed in a first seal carrier ring and a second seal unit including a second seal element disposed in a second seal carrier ring and a third seal unit including a third seal element disposed in a third seal carrier ring, each of the first, second and third seal elements having a seal lip in contact with the slip surface.

9. The sealed bearing unit according to claim 8, wherein the first seal unit is located axially between the second seal unit and the outer ring and wherein the first seal carrier ring is mounted directly on the outer ring and the second seal carrier ring is mounted directly on the first seal carrier ring.

10. The sealed bearing unit according to claim 9, including a fourth seal element mounted directly on the outer ring and having a seal lip in contact with the slip surface, the fourth seal element being located axially between the first seal carrier ring and the outer ring.

11. The sealed bearing module according to claim 10, wherein the spacer ring has a radially outer surface, wherein a slip ring is mounted on the radially outer surface of the spacer ring, and wherein the slip surface is formed on a radially outer surface of the slip ring.

12. The sealed bearing module according to claim 1, wherein the inner ring includes gear teeth.

13. The sealed bearing module according to claim 1,
wherein the outer ring is a split outer ring,
wherein the inner ring is attachable to the rotor blade indirectly via the spacer ring,
wherein the seal system includes a slip surface that radially surrounds the inner ring or the spacer ring and a plurality of seal units, each seal unit including a seal element disposed in a respective seal carrier ring, each seal element having a seal lip in contact with the slip surface,
wherein one of the seal units is disposed directly on the outer ring,
wherein the seal system includes a seal cover,
wherein the remaining seal units are disposed between the seal unit on the outer ring and the seal cover, and
wherein the inner ring includes gear teeth.

14. The sealed bearing module according to claim 1,
wherein the seal system includes a slip surface that radially surrounds the inner ring or the spacer ring and a plurality of annular seal elements each having at least one seal lip in sliding contact with the slip surface.

15. A tidal turbine including a hub and at least one rotor blade, between which a sealed bearing module according to claim 1 is disposed.

16. A sealed bearing module for a tidal turbine, the tidal turbine including a hub and at least one rotor blade, the sealed bearing module comprising:
a hub side configured to face and be connected to the hub;
a rotor blade side axially opposite the hub side;
an outer ring;
an inner ring;
a spacer ring axially adjacent the inner ring, the spacer ring having a radially outer surface;
a slip ring having a radially inner surface mounted on the radially outer surface of the spacer ring and a radially outer surface forming a slip surface; and
a seal system configured to seal the bearing module, the seal system including a first seal unit comprising a first seal element disposed in a first seal carrier ring, the first seal carrier ring being mounted to the rotor blade side of the outer ring with the first seal element in contact with the slip surface,
wherein
the outer ring includes blind axial bores extending into the outer ring from the hub side, the axial bores being configured to receive a threaded fastener for attaching the outer ring directly to the hub,
the inner ring includes first axial bores for attaching the inner ring to the spacer ring,
the spacer ring includes second axial bores on the rotor blade side for attaching the spacer ring to the rotor blade, and
wherein the first axial bores do not communicate with the second axial bores.

17. The sealed bearing module according to claim 16, including a second seal unit comprising a second seal element disposed in a second seal carrier ring, the second seal carrier ring being mounted to the rotor blade side of the first seal carrier ring with the second seal element in contact with the slip surface.

18. The sealed bearing unit according to claim 17, including a third seal element mounted directly on the outer ring and having a seal lip in contact with the slip surface, the third seal element being located axially between the first seal carrier ring and the outer ring.

19. The sealed bearing unit according to claim 18, wherein the first and second axial bores are blind bores.

20. The sealed bearing unit according to claim 16, wherein the first and second axial bores are blind bores.

* * * * *